(12) United States Patent
Werner

(10) Patent No.: US 7,591,006 B2
(45) Date of Patent: Sep. 15, 2009

(54) SECURITY FOR EXTERNAL SYSTEM MANAGEMENT

(75) Inventor: Randolf Werner, Wiesloch-Baiertal (DE)

(73) Assignee: SAP AG, Walldorf (DE)

( * ) Notice: Subject to any disclaimer, the term of this patent is extended or adjusted under 35 U.S.C. 154(b) by 919 days.

(21) Appl. No.: 11/026,323

(22) Filed: Dec. 29, 2004

(65) Prior Publication Data

US 2006/0168646 A1 Jul. 27, 2006

(51) Int. Cl.
*G06F 7/04* (2006.01)
*G06F 17/30* (2006.01)
*G06F 7/58* (2006.01)
*G06F 15/16* (2006.01)
*G06F 12/00* (2006.01)
*G06F 12/14* (2006.01)
*G06F 13/00* (2006.01)
*G06K 9/00* (2006.01)
*G06K 19/00* (2006.01)
*H04L 9/32* (2006.01)
*H04L 9/00* (2006.01)
*G11C 7/00* (2006.01)
*H03M 1/68* (2006.01)
*H04K 1/00* (2006.01)
*H04N 7/16* (2006.01)
*B41K 3/38* (2006.01)

(52) U.S. Cl. .................. 726/4; 726/2; 726/3; 726/5; 726/16; 726/17; 726/19; 726/21; 726/26; 726/27; 726/28; 726/29; 713/150; 713/151; 713/152; 713/168; 713/182; 380/59

(58) Field of Classification Search .......... 726/2–5, 726/16, 17, 19, 21, 26, 27–29; 713/150–152, 713/168, 182; 380/59

See application file for complete search history.

(56) References Cited

U.S. PATENT DOCUMENTS

| 5,566,302 A | 10/1996 | Khalidi et al. |
| 5,745,778 A | 4/1998 | Alfieri |
| 5,999,179 A | 12/1999 | Kekic et al. |

(Continued)

FOREIGN PATENT DOCUMENTS

EP 0 459 931 A2 12/1991

(Continued)

OTHER PUBLICATIONS

"6570P207 FOA Mailed Aug. 17, 2007 for U.S. Appl. No. 11/013,277", Whole Document.

(Continued)

*Primary Examiner*—Nasser G Moazzami
*Assistant Examiner*—Oscar A Louie
(74) *Attorney, Agent, or Firm*—Blakely Sokoloff Taylor & Zafman LLP

(57) ABSTRACT

A system and method for enhanced security for external system management. A request to manage a system is received from a client at an interface. A determination is made whether a level of security is desired for the interface. If a level of security is desired for the interface, then identification information is obtained from the request and is converted into a format that is compatible with the system to be managed. A determination is made whether the system provides authorization for the client to manage the system.

14 Claims, 7 Drawing Sheets

U.S. PATENT DOCUMENTS

| | | | |
|---|---|---|---|
| 6,115,712 | A | 9/2000 | Islam et al. |
| 6,115,721 | A | 9/2000 | Nagy |
| 6,282,566 | B1 | 8/2001 | Lee, Jr. et al. |
| 6,336,170 | B1 | 1/2002 | Dean et al. |
| 6,345,386 | B1 | 2/2002 | Delo et al. |
| 6,415,364 | B1 | 7/2002 | Bauman et al. |
| 6,424,828 | B1 * | 7/2002 | Collins et al. ............ 455/412.1 |
| 6,615,253 | B1 | 9/2003 | Bowman-Amuah |
| 6,640,244 | B1 | 10/2003 | Bowman-Amuah |
| 6,687,702 | B2 | 2/2004 | Vaitheeswaran et al. |
| 6,760,911 | B1 | 7/2004 | Ye |
| 6,769,022 | B1 | 7/2004 | DeKoning et al. |
| 6,772,409 | B1 | 8/2004 | Chawla et al. |
| 7,024,695 | B1 * | 4/2006 | Kumar et al. ................. 726/26 |
| 7,089,566 | B1 | 8/2006 | Johnson |
| 7,149,741 | B2 | 12/2006 | Burkey et al. |
| 7,203,769 | B2 | 4/2007 | Schnier |
| 7,296,267 | B2 | 11/2007 | Cota-Robles et al. |
| 7,302,423 | B2 | 11/2007 | De Bellis |
| 2001/0029520 | A1 | 10/2001 | Miyazaki |
| 2002/0078060 | A1 | 6/2002 | Garst et al. |
| 2002/0129264 | A1 * | 9/2002 | Rowland et al. ............ 713/200 |
| 2002/0174097 | A1 | 11/2002 | Rusch et al. |
| 2002/0181307 | A1 | 12/2002 | Fifield et al. |
| 2003/0014521 | A1 | 1/2003 | Elson et al. |
| 2003/0014552 | A1 | 1/2003 | Vaitheeswaran et al. |
| 2003/0037178 | A1 | 2/2003 | Vessey et al. |
| 2003/0084248 | A1 | 5/2003 | Gaither et al. |
| 2003/0105887 | A1 | 6/2003 | Cox et al. |
| 2003/0115190 | A1 | 6/2003 | Soderstrom et al. |
| 2003/0177356 | A1 * | 9/2003 | Abela ......................... 713/168 |
| 2003/0177382 | A1 | 9/2003 | Ofek et al. |
| 2003/0191795 | A1 | 10/2003 | Bernardin et al. |
| 2003/0195923 | A1 | 10/2003 | Bloch et al. |
| 2003/0196136 | A1 | 10/2003 | Haynes et al. |
| 2003/0212654 | A1 | 11/2003 | Harper et al. |
| 2004/0003033 | A1 | 1/2004 | Kamen et al. |
| 2004/0024610 | A1 | 2/2004 | Fradkov et al. |
| 2004/0024971 | A1 | 2/2004 | Bogin et al. |
| 2004/0045014 | A1 | 3/2004 | Radhakrishnan |
| 2004/0181537 | A1 | 9/2004 | Chawla et al. |
| 2004/0187140 | A1 | 9/2004 | Aigner et al. |
| 2004/0205144 | A1 | 10/2004 | Otake |
| 2005/0160396 | A1 | 7/2005 | Chadzynski |
| 2005/0262181 | A1 | 11/2005 | Schmidt et al. |
| 2005/0278346 | A1 | 12/2005 | Shang et al. |
| 2006/0053112 | A1 | 3/2006 | Chitkara et al. |
| 2006/0059453 | A1 | 3/2006 | Kuck et al. |
| 2006/0070051 | A1 | 3/2006 | Kuck et al. |
| 2006/0094351 | A1 | 5/2006 | Nowak et al. |
| 2006/0150197 | A1 | 7/2006 | Werner |
| 2006/0159197 | A1 | 7/2006 | Kraut et al. |
| 2006/0167980 | A1 | 7/2006 | Werner |
| 2006/0168646 | A1 | 7/2006 | Werner |
| 2006/0168846 | A1 | 8/2006 | Juan |
| 2006/0206856 | A1 | 9/2006 | Breeden et al. |

FOREIGN PATENT DOCUMENTS

| | | |
|---|---|---|
| WO | WO-00/23898 | 4/2000 |

OTHER PUBLICATIONS

"6570P207 OA Mailed Jan. 7, 2008 for U.S. Appl. No. 11/013,277", Whole Document.

"6570P207 OA Mailed Mar. 12, 2007 for U.S. Appl. No. 11/013,277", Whole Document.

"6570P208 FOA Mailed Aug. 17, 2007 for U.S. Appl. No. 11/013,278", Whole Document.

"6570P208 OA Mailed Feb. 5, 2008 for U.S. Appl. No. 11/013,278", Whole Document.

"6570P208 OA Mailed Mar. 16, 2007 for U.S. Appl. No. 11/013,278", Whole Document.

"6570P209 FOA Mailed Aug. 28, 2007 for U.S. Appl. No. 11/012,803", Whole Document.

"6570P209 OA Mailed Jan. 24, 2008 for U.S. Appl. No. 11/012,803", Whole Document.

"6570P209 OA Mailed Mar. 16, 2007 for U.S. Appl. No. 11/012,803", Whole Document.

"6570P217 OA Mailed Feb. 21, 2008 for U.S. Appl. No. 11/027,812", Whole Documents.

"6570P220 OA Mailed Jan. 10, 2008 for U.S. Appl. No. 11/027,387", Whole Document.

"6570P220 OA Mailed Apr. 19, 2007 for U.S. Appl. No. 11/027,387", Whole Document.

"What is LDAP?", http://www.gracion.com/server/whatldap.html, (Dec. 7, 2004).

Tuttle, Steven , et al., "Understanding LDAP Design and Implemenation", IBM.com Redbooks, (Jun. 2004), 1-774.

"6570P208 FOA Mailed Aug. 13, 2008 for U.S. Appl. No. 11/013,278 Whole Document".

Casavant, T. L., et al., ""A Taxonomy of Scheduling in General-Purpose Distributed Computing Systems"", Casavant, T.L., and Kuhl, J.G., "A Taxonomy of Scheduling in General-Purpose Distributed Computing Systems," IEEE 14(2):141-154, (1988) XP000039761., (1988), 141-154.

Dandamudi, S. P., "Reducing Run Queue Contention in Shared Memory Multiprocessors", Dandamudi, S.P., "Reducing Run Queue Contention in Shared Memory Multiprocessors," IEEE pp. 82-89 (1997) XP000657329., (1997), 82-89.

Tanenbaum, A. S., "Multimedia Operating Systems", Tanenbaum, A.S., Modern Operating Systems, 2nd Edition, Upper Saddle River, New Jersey: Prentice-Hall, Inc., pp. 531-578 (2001). English Translation of: MODERNEBETRIEBSSYSTEME, vol. 2, pp. 539-617, (2002) XP002385695., (2002), 539-617.

USPTO, "6570P217 FOA Mailed Aug. 19, 2008 for U.S. Appl. No. 11/027,812", Whole Document.

USPTO, "6570P220 OA Mailed Oct. 3, 2008 for U.S. Appl. No. 11/027,387", Whole Document.

Yue, K. K., et al., "An Effective Processor Allocation Strategy for Multiprogrammed Shared-Memory Multiprocessors", Yue, K.K. and Lilja, D.J., "An Effective Processor Allocation Strategy for Multiprogrammed Shared-Memory Multiprocessors," IEEE 8(12):1246-1258, (1997)., (1997), 1246-1258.

Non-Final Office Action for U.S. Appl. No. 11/013,278, Mailed Dec. 23, 2008, 28 pages.

Non-Final Office Action for U.S. Appl. No. 11/012,803, Mailed Dec. 23, 2008, 22 pages.

Non-Final Office Action for U.S. Appl. No. 11/026,604, Mailed Dec. 30, 2008, 18 pages.

Non-Final Office Action for U.S. Appl. No. 11/026,604, Mailed Jan. 27, 2009, 18 pages.

Notice of Allowance for U.S. Appl. No. 11/027,387, Mailed Feb. 23, 2009, 8 pages.

Final Office Action for U.S. Appl. No. 11/021,803, Mailed Jul. 22, 2008, 22 pages.

Final Office Action for U.S. Appl. No. 11/013,277, Mailed Aug. 7, 2008, 22 pages.

Non-Final Office Action for U.S. Appl. No. 11/013,277, Mailed Jan. 6, 2009, 22 pages.

Non-Final Office Action for U.S. Appl. No. 11/027,812, Mailed Apr. 2, 2009, 19 pages.

Notice of Allowance for U.S. Appl. No. 11/013,278, Mailed Jun. 11, 2009, 25 pages.

Notice of Allowance for U.S. Appl. No. 11/012,803, Mailed Jun. 10, 2009, 27 pages.

"Notice of Allowance for U.S. Appl. No. 11/013,277, Mailed Jun. 25, 2009, 24 pages", (Jun. 25, 2009).

* cited by examiner

SECURITY FOR EXTERNAL SYSTEM MANAGEMENT

TECHNICAL FIELD

Embodiments of the invention generally relate to the field of client/server systems and, more particularly, to a system and method for security for external system management.

BACKGROUND

In the operation of a server, external management of systems may provide convenient and powerful management operations. In general, an external client connects to the server through an interface and manages the system through such interface, including starting and stopping the system and monitoring activity of the system as needed.

However, the external management of any system requires consideration of security risk. The use of external management implies that an external client will have control of a system, and authentication procedures are required to provide sufficient assurance that the client is authorized to manage the system.

A system is in risk of compromise if the interface between the server and the client does not provide a sufficient level of security and authentication of identity. This level of security provided by an interface will depend in part on the technology that is used to establish and operate the interface. If the security of the interface is not sufficient for the processes in question, other security measures may be needed to ensure that the system is protected and that control of the system is not compromised.

SUMMARY OF THE INVENTION

A system and method for security for external system management are described.

According to a first embodiment of the invention, a method includes receiving a request to manage a system from a client at an interface, and determining if a level of security is desired. If a level of security is desired, identification information is obtained from the request and a determination is made regarding whether the system to be managed includes authorization for the client to manage the system.

Under a second embodiment of the invention, a server includes a container comprising an application, with the application including authorization data, and an interface, with the interface to be connected to a client system for management of the application. The interface includes a security function that extracts identity information from a communication from a client system and determines whether the client system has authority to manage the application.

Under a third embodiment of the invention, a system includes a client system, where the client system provides a communication to request to manage a computer application, and a server. The server includes the computer application and an interface, where the client system is to be coupled with the interface and where the computer application includes data regarding access credentials. The interface is to extract identification information from the communication, convert the identification information into a format compatible with the computer application, and compare the converted identification information with data regarding access credentials to determine whether the client system is authorized to access the computer application.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
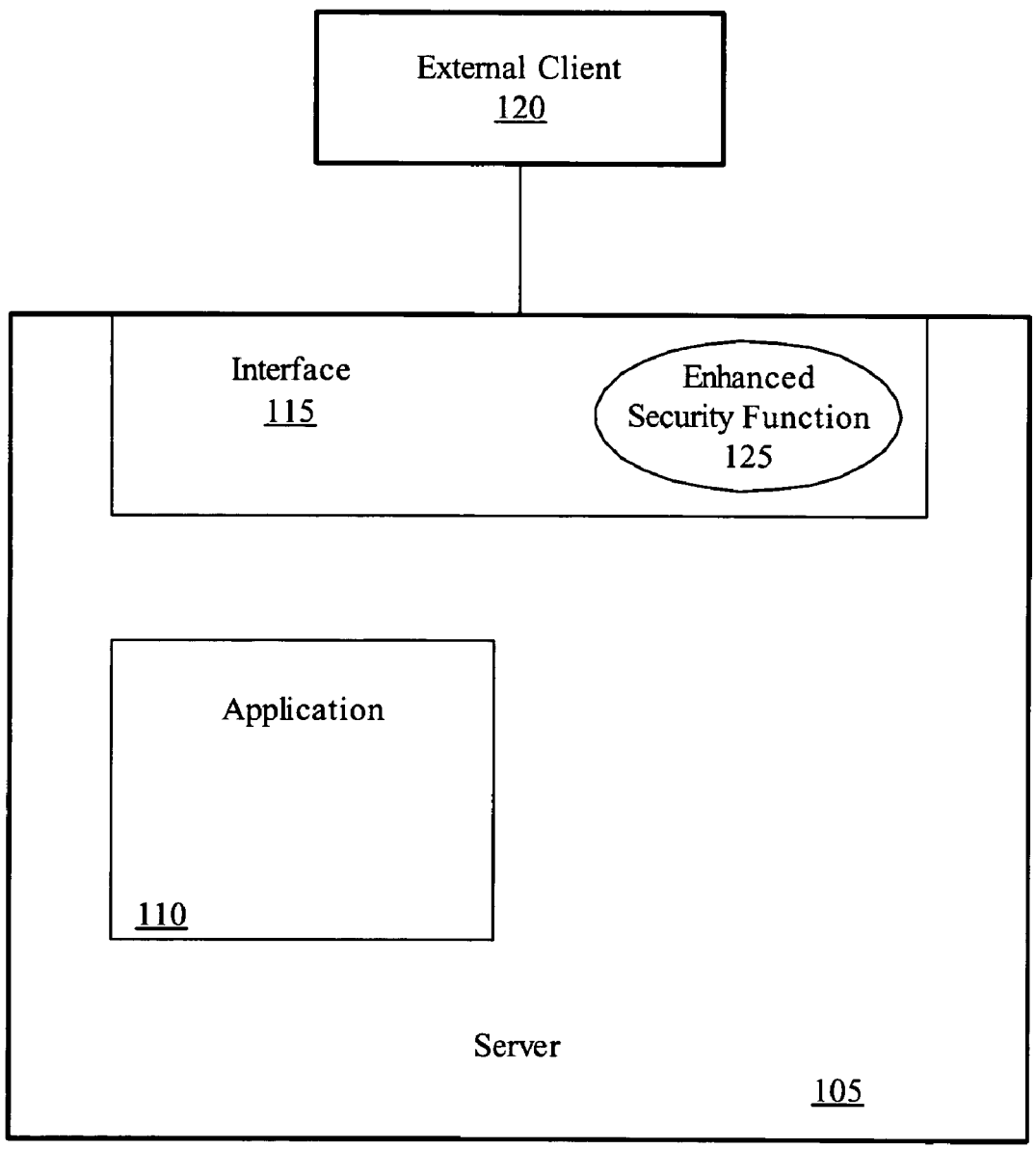
FIG. 1 is an illustration of an embodiment of a server and client system.

Embodiments of the invention are generally directed to a system and method for security for external system management.

As used herein, "Web service" means a software application assessable in a web environment. Web service includes the term as used by the World Wide Web Consortium (W3C) in applicable standards.

In an embodiment of the invention, security is provided for external management of systems. In one embodiment, security is provided to supplement security provided by a server interface. In one embodiment, a server utilizes security data for an externally managed system to enhance security provided by an interface to the server.

In one embodiment of the invention, a server utilizes an interface to an external client, the external client managing a system through the interface. The management of the system may include, but is not limited to, starting, stopping, and monitoring operations of the system. In one possible example, a web service is utilized for external management of a system. In one embodiment, additional security may be provided for an interface, such as in circumstances in which security function is limited by the interface system.

In one embodiment of the invention, additional security may be provided for a server interface using authentication information for a managed system. In one embodiment, an interface to a server that provides access to a system for an external client obtains identification information from a communication from the external client for authorization. In one embodiment, the server extracts identification information from a communication, coverts such identification data to a format compatible with the managed system, and compares the identification information to authentication information from the managed system.

In one embodiment, external system management is implemented in a web service interface. In one embodiment, a server includes a web service interface. In such embodiment, an external manager of a system accesses the web service in order to provide external management of an application or other system. In one embodiment, a server registers a web service as an interface for external clients. A client system seeking to manage a system on the server finds the web service and binds the web service in order to engage in management activities with regard to the system. In one embodiment, the web service obtains identification information from a communication from the client system. The web service authenticates the client system using data of the one or more systems to be managed. If the web service is successful in authenticating the client system, the client system is allowed to engage in management of the system.

In one embodiment, a server interface provides access to one or more systems for external management by one or more external clients. The management by external clients provides powerful management capability access, but requires sufficient safeguards in operation. In one embodiment, the platform used to establish the interface may not provide sufficient authentication capability for external clients. In one embodiment, the interface is a universal interface that is intended to provide access to various different types of external clients. In one possible example, an interface may be established using a web service, but embodiments of the invention are not limited to such technology. A web service, while offering significant power and flexibility for operations with many different computer platforms, in general provides limited security functions.

In one embodiment of the invention, an accessing system that seeks to externally manage a system on a server provides a communication to the server through the interface. In the embodiment, the interface extracts identification information from the communication and converts such identification information into a format compatible with the managed system, which may include eliminating any extraneous information. The server then utilizes the converted identification information to determine whether the accessing system is authorized. The determination of authorization thereby utilizes authentication information already found in a managed system to provide interface security. In one embodiment, a server modifies received information to generate a searchable identification in the context of the managed system. The server then searches the managed system to determine whether the managed system contains authentication for the user of the accessing system. In one embodiment of the invention, a client is not allowed to proceed through a server interface unless the server is able to extract identification information and to authenticate the authority of the client for access to a system.

In one embodiment, an enhanced authentication process for a server interface is utilized when sufficient authentication processes are not available for the interface or when a level of security is desired. When sufficient authentication processes are available for the interface, the enhanced authentication process is not utilized. The use of secure technology in some cases may reduce the need for enhanced authentication processes. In one example, a transaction may utilize a secure object, such as a UNIX domain socket or Windows named pipe. The use of the secure object may provide sufficient assurance of authentication and thus enhanced authentication may not be required or desired in such circumstances.

The processes for providing security will vary with the circumstances. In one example, a Windows system may provides a user name account to a web service, and the web service may be unable to use the account information to authenticate the account. In one embodiment, the web service strips off the account information to obtain the user name. In an embodiment, the web service utilizes the name to determine whether an account exists for the user. In one embodiment, the security is in addition to any other security processes that are in place.

In an embodiment of a web application server, a startup and control framework may be utilized to start, stop, and monitor a system such as a J2EE (Java 2 Platform, Enterprise Edition) instance. The framework may be used to monitor and control an application remotely. In one embodiment of the invention, a web service is used in the startup and control framework. In one embodiment, a single startup and control framework may be addressed by multiple types of client systems for application monitoring and control. In one embodiment, a platform independent framework is provided for external management of systems. In an embodiment, an application server (a component server that is compliant with the J2EE environment) may be accessed by multiple different client systems using the same interface. Because the client systems vary in platform, the account or identification information will vary, and thus the extracted identification information may require conversion to be compatible with the underlying application.

In one embodiment of the invention, a startup and control program, such as, for example, the Jcontrol program utilized in a product produced by SAP AG (SAP), is started through a web service interface. In an embodiment, the web service interface may start the startup and control program regardless of the type of platform utilized by a client. In one example, a managed system may comprise a J2EE instance. The startup and control program may initialize and monitor the J2EE instance, continuously checking the status of the elements of the instance and restarting any terminated processes.

In general, a web service provides a software system designed to support interoperable machine-to-machine interaction over a network. Web services conform to certain standards and thus provide a means of communication between applications on different platforms. Web services provide a mechanism for applications to communicate and interrelate in a platform independent fashion. Web services therefore may enable a service-oriented architecture in which certain services are reusable and transferable among heterogeneous environments, providing a common method for actions such as accessing data, providing instructions, and instituting other such actions.

Under an embodiment of the invention, a web service interface is implemented in a J2EE (Java 2 Platform, Enterprise Edition) platform. The J2EE platform is described in the J2EE specification, including as provided in version 1.4, Nov. 24, 2003. The implementation of a web service in a J2EE platform assists in providing portability of the client management processes.

The standards that are followed in web services include the use of XML (eXtensible Mark-up Language) for communication, including Extensible Markup Language (XML) 1.0 (Third Edition), Feb. 4, 2004, by the World Wide Web Consortium (W3C); SOAP (simple object access protocol) for the exchange of information, including SOAP Version 1.2, Jun. 24, 2003 by the W3C; WSDL (web services description language) for description of web service details, including Web Service Description Language Version 2.0, Aug. 3, 2003 by the W3C; and UDDI (universal description, discovery, and integration) for looking up web services, including Universal Description, Discover, and Integration Version 3.0. Numerous other specifications and recommendations may affect the structure and design of a web service. A web service has an interface that is described in a machine-processable format, with such format being WSDL. Other systems will interact with a web service in the manner that is prescribed in the web service's description using SOAP-messages, which are typically conveyed using HTTP (Hypertext Transfer Protocol).

Under an embodiment, a web service interface for monitoring systems is implemented using an open source product.

In one embodiment, a system is implemented with SOAP, which is a light-weight protocol for exchanging messages between computer software. SOAP is intended to provide an extensible and decentralized framework that can work over multiple computer network protocol stacks. In this regard, remote procedure calls can be modeled as an interaction of several SOAP messages. SOAP can be run on top of all Internet protocols, but SOAP is commonly run on HTTP, as provided by W3C.

In general, any web service enabled client that can handle XML-RPC (Remote Procedure Calling) encoded communications may access a web service interface. XML-RPC includes a set of implementations to allow software running on disparate operating systems in different environments to make procedure calls over the Internet. The XML-RPC is defined by the relevant specification, XML-RPC Specification, Jun. 15, 1999. The applicable clients may include, but are not limited to, C/C++, Microsoft.NET, JAVA, and numerous other clients.

For the purposes of web services, when one application is to allow connection and access by other applications, the process is described utilizing WSDL. WSDL is used to specify details of a web service, thereby allowing an external system to utilize the web service without prior knowledge of details of the web service. WSDL provides a format that describes a network service as a set of endpoints operating on messages containing either document-oriented or procedure-oriented information. A WSDL document defines services as collections of network endpoints, or ports. In WSDL, the abstract definition of endpoints and messages is separated from the defined network deployment or data format bindings. This process thereby allows the reuse of abstract definitions, the definitions being messages, which are abstract descriptions of the data being exchanged, and port types, which are abstract collections of operations. The concrete protocol and data format specifications for a particular port type constitute a reusable binding. A port is defined by associating a network address with a reusable binding, with a collection of ports defining a service. In the provision of a web service, a WSDL document uses the following elements in the definition of services:

(a) Types—A container for data type definitions using a type system;
(b) Message—An abstract, typed definition of data being communicated;
(c) Operation—An abstract description of an action supported by the service;
(d) Port Type—An abstract set of operations supported by one or more endpoints;
(e) Binding—A concrete protocol and data format specification for a particular port type;
(f) Port—A single endpoint defined as a combination of a binding and a network address; and
(g) Service—A collection of related endpoints.

FIG. 1 is an illustration of an embodiment of a server and client system. In this illustration, a server 105 includes one or more systems, including application 110. In one example, an external client 120 seeks to provide external management of application 110. In one embodiment of the invention, the external client 120 attempts to connect with the application server 105 through an interface 115. In one embodiment, the interface 115 supports multiple different types of client platforms. The interface 115 may not provide sufficient security capability to ensure that external client 120 has sufficient authorization to manage application 110. In one embodiment, the interface includes an enhanced security function 125. The enhanced security function 125 extracts identification information from data from the external client 120, converts the identification information into a format that is compatible with the application 110, and searches the application 110 for the identification information.

Figure 2:
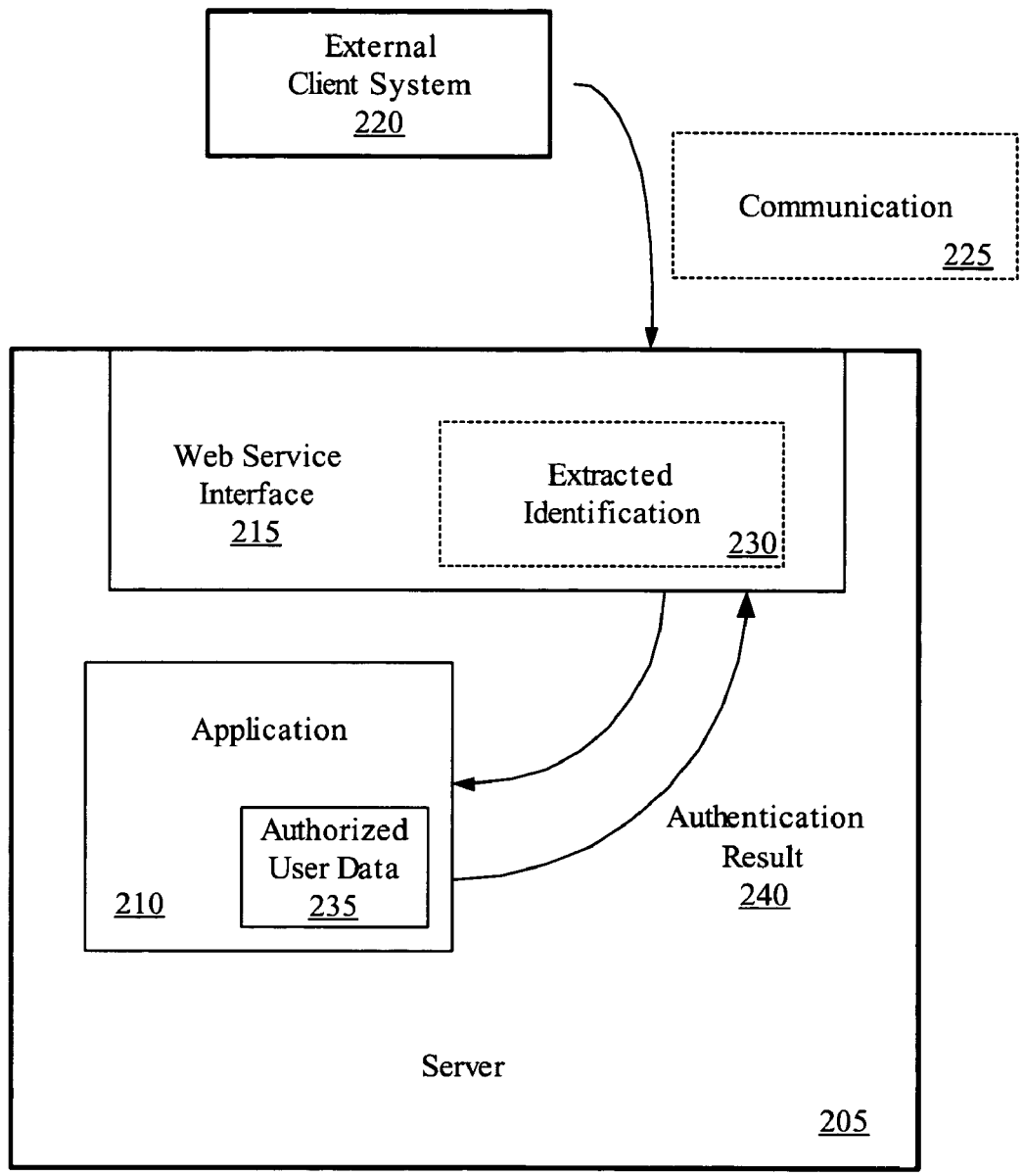
FIG. 2 is an illustration of an embodiment of provision of security for a web service interface.

FIG. 2 is an illustration of an embodiment of provision of security for a web service interface. In one embodiment, a server 205 includes an application 210. The server further includes a web service 215 to be used to provide an interface with client systems to externally manage applications. In this illustration, an external client system 220 attempts to establish management of the application 210, including a communication 225 from the external client system 220 to the server 205. The web service interface 215 is utilized to extract identification information 230 from the communication and convert the identification information into a form that is compatible with authorized user data 235 for the application 210. The identification information 230 is compared with the authorized user data 235. An authentication result 240 indicates whether the external client system 220 is authorized to manage the application 210.

Figure 3:
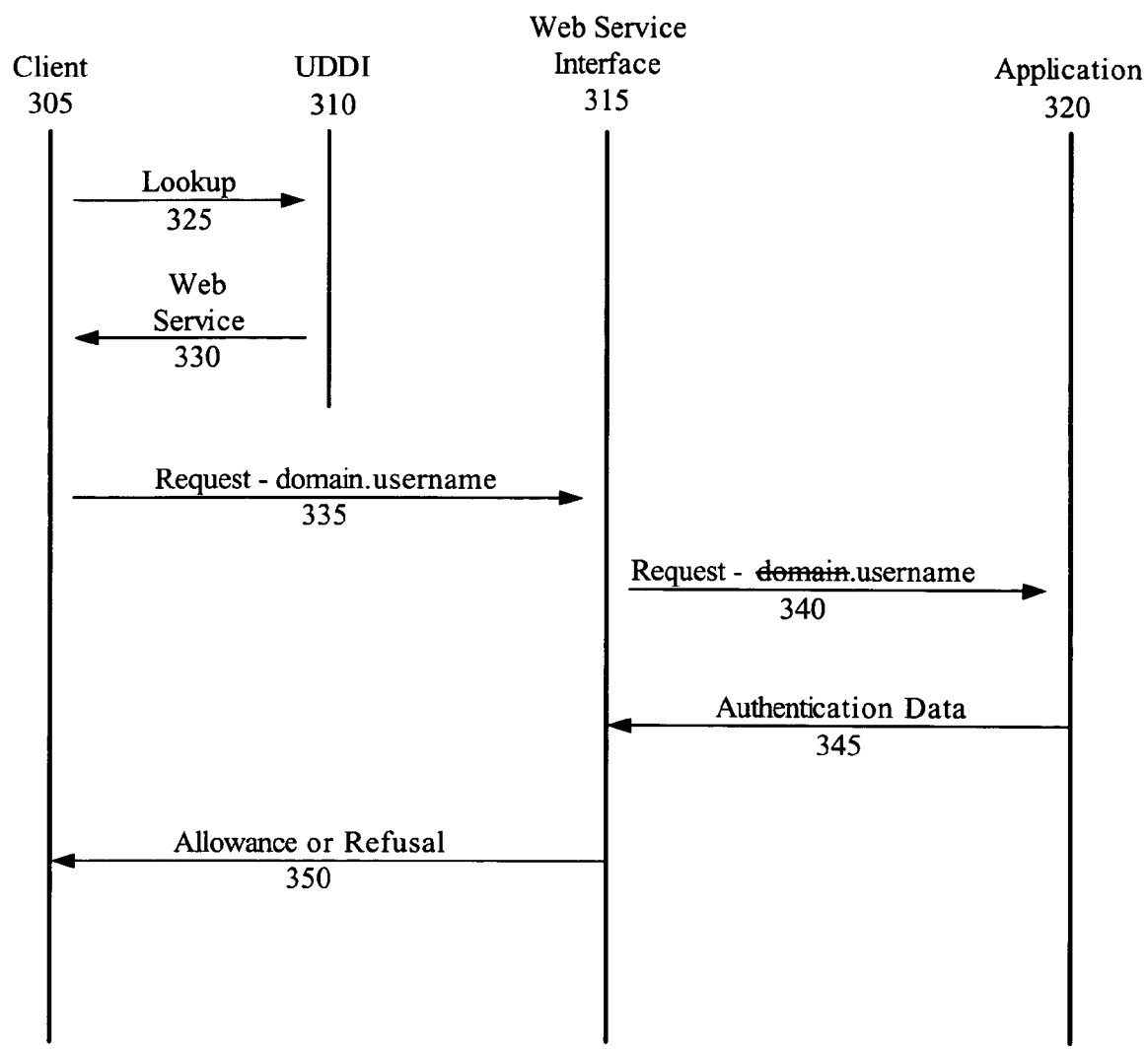
FIG. 3 is an illustration of signals for an embodiment of the invention.

FIG. 3 is an illustration of signals for an embodiment of the invention. Illustrated are a client 305, a UDDI registry 310, a web service interface 315, and an application 320. In an embodiment of the invention, the client performs a lookup 325 for the web service on the UDDI registry 310 and discovers the web service 330. The client 305 sends a request or other communication 335 to the web service interface. The communication from the client may include identification data, such as, in one example, the domain and username of the client. The communication will generally be in a format reflecting the platform of the client, and thus may not be compatible with the application 320. The web service interface will convert the identification data into a form that can be compared with data for the application. For example, the web service interface 315 may strip away the domain name and transfer the user name to the application 340. The application may return authorization data 345 to the web service interface 315. Based at least in part on the authorization data 345, the web service interface will allow or refuse service to the client 305.

Figure 4:
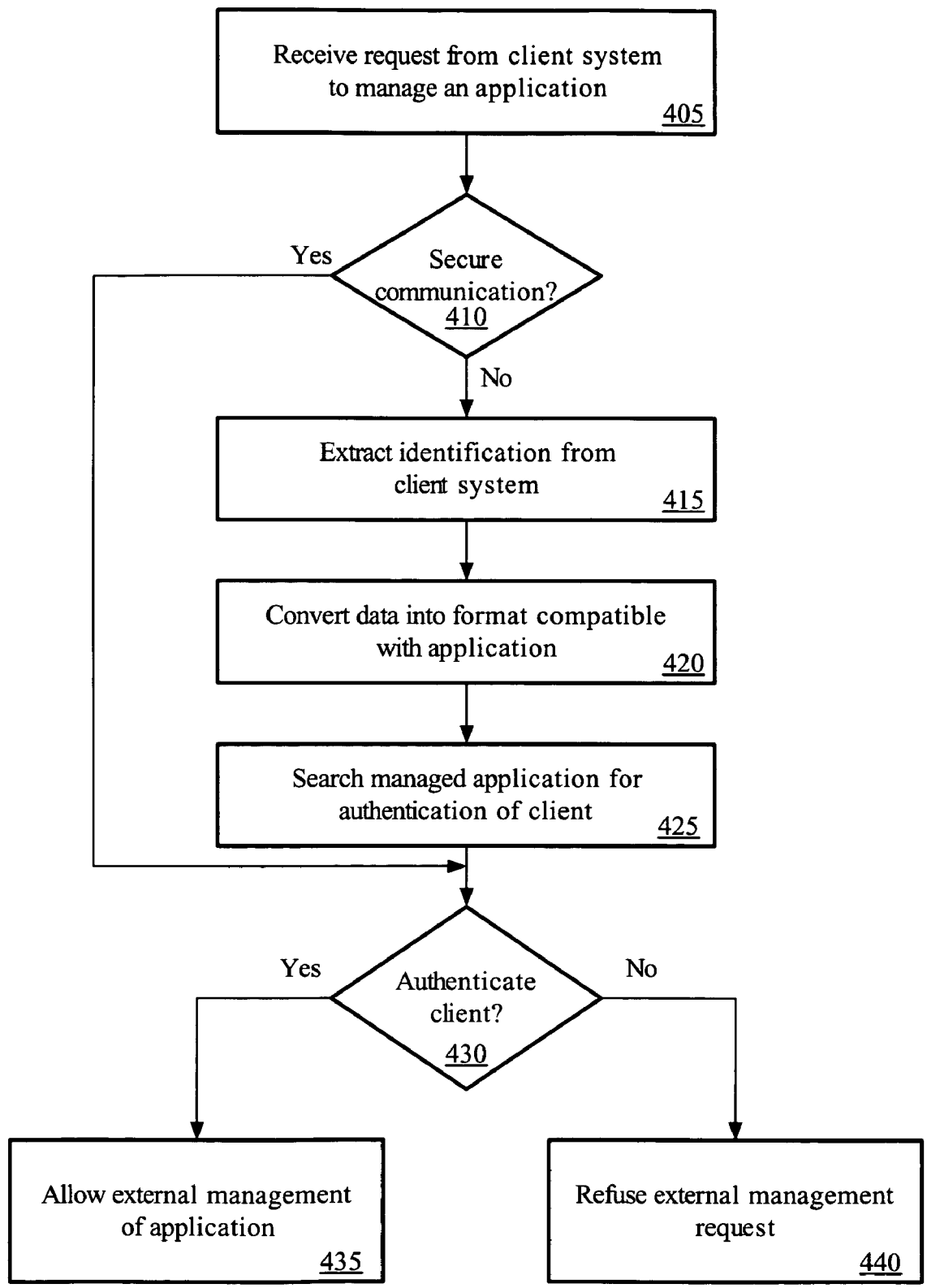
FIG. 4 is a flowchart to illustrate an embodiment of security operations.

FIG. 4 is a flowchart to illustrate an embodiment of security operations. In this illustration, a request to manage an application is received from a client system 405. In an embodiment, there is a determination whether the communication is secure 410. A secure communication may include a UNIX domain socket, Windows named pipe or other secure object. If the communication is secure, the process may proceed to determine whether it can authenticate the client 430. If the communication is not secure, an enhanced security process is utilized. In one embodiment, an identification is extracted from the client system request 415, and the identification is converted into a format that is compatible with the application 420. The managed application is searched to attempt to authenticate the client 425. Using either the secure communication or the enhanced security process, there is a determination whether the client can be authenticated 430. If so, external management of the application is allowed 435. If not, then the external management request is refused 440.

Figure 5:
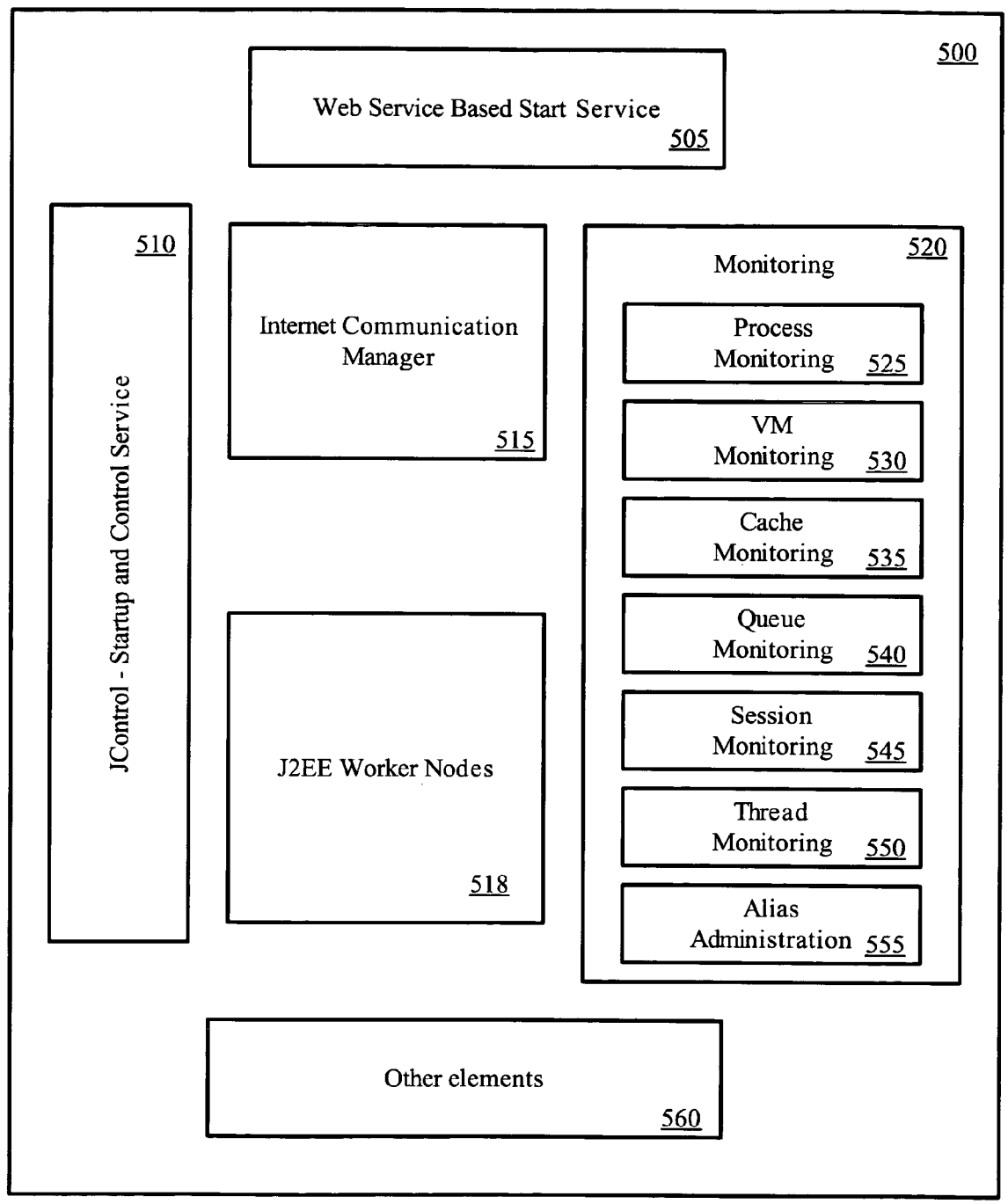
FIG. 5 is an illustration of an embodiment of an externally managed J2EE instance.

FIG. 5 is an illustration of an embodiment of an externally managed J2EE instance. In this illustration, a J2EE instance 500 includes a web service based start service 505 that operates in conjunction with a universal interface for multiple different types of client platforms. For any supported platform, the web service based start system 505 will initiate a startup and control service 510. The startup and control service 510 may then provide startup and control of J2EE worker nodes 518. In one embodiment, a communication with the web service based start service 505 may initiate an enhanced security operation. Data presented to the start service 505 is transformed to extract an identification that is compatible with authorization information for the instance 500 in order to determine whether a request to manage the instance is authorized.

FIG. 5 also illustrates an Internet communication manager 515 to provide communications for the instance 500. Further, there is shown monitoring elements 520 to monitor operations of the instance 500. The monitoring 520 may include, but is not limited to, process monitoring 525, virtual machine (VM) monitoring 530, cache monitoring 535, queue monitoring 540, session monitoring 545, thread monitoring 550, and alias administration 555. Other elements 560 may also be included in the J2EE instance 500.

Figure 6:
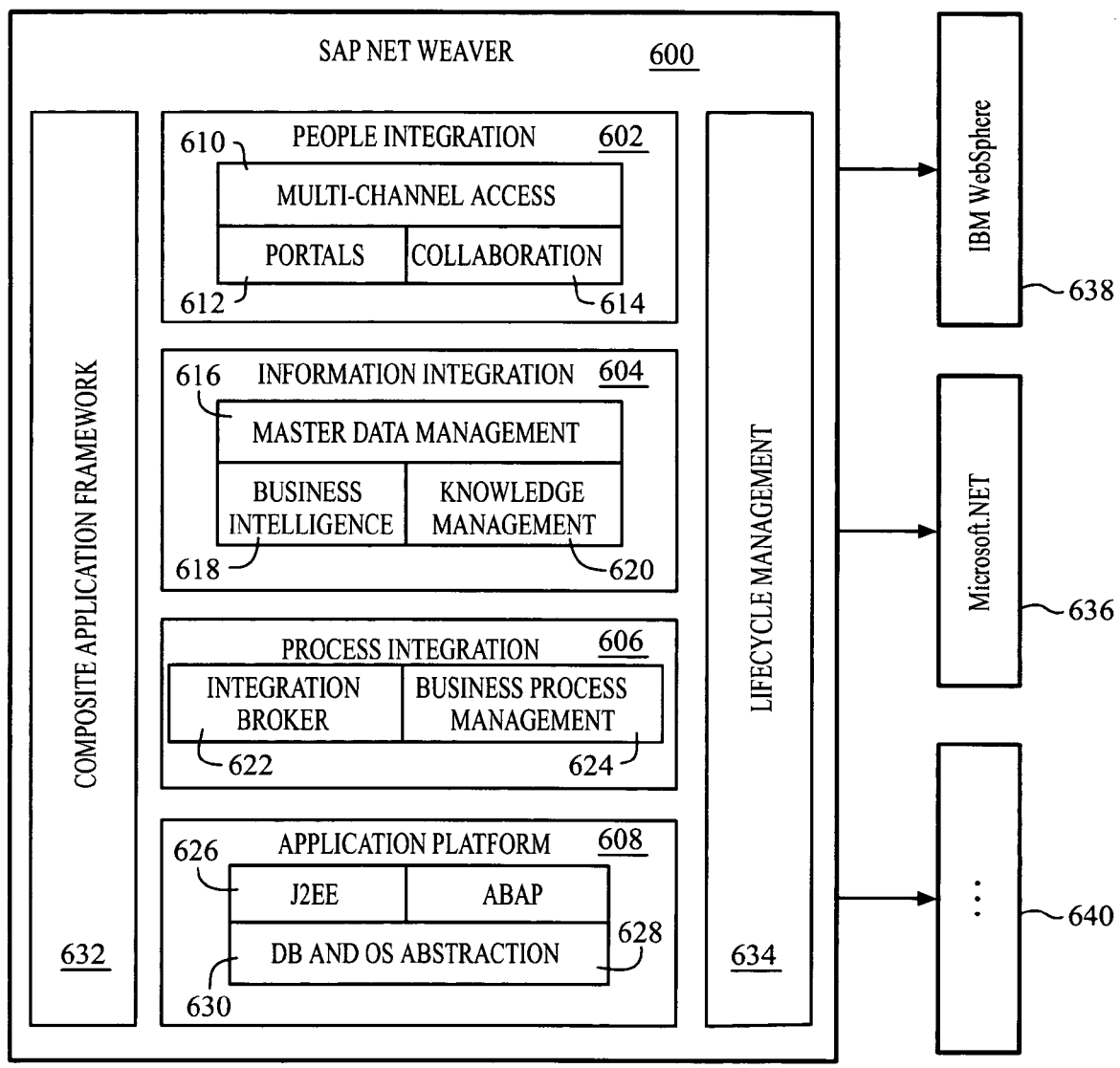
FIG. 6 is a diagram illustrating an embodiment of a system architecture.

FIG. 6 is a diagram illustrating an embodiment of a system architecture. In one embodiment, the diagram illustrates core components of the SAP NetWeaver architecture 600, in which a web service interface for external management may be implemented. The system architecture 600 comprises various SAP platforms that are merged together to provide the integration of people, information, and processes in one solution. The architecture 600 includes people integration 602, information integration 604, process integration 606, and an application platform 608.

People integration 602 is performed using a portal solution 612 and a platform to work in collaboration 614. Users are provided a multi-channel access 610 to ensure mobility. Examples of the portal solution 612 include SAP Enterprise Portal, SAP Mobile Engine, and Collaboration Package for SAP Enterprise Portal. Information integration 604 refers to the conversion of information into knowledge. Information integration 604 provides efficient business intelligence 618 and knowledge management 620 using, for example, SAP products such as Business Information Warehouse (BW) and Knowledge Management (KM). Further, consolidation of master data management beyond system boundaries is performed using SAP's Master Data Management (MDM) 616. Process integration 606 refers to optimized process management using integration broker or SAP exchange infrastructure 622 and business process management 624 techniques. Examples of products to perform process integration 606 include Exchange Infrastructure (XI) and Business Process Management (BPM).

An application platform 608 may include SAP's Web Application Server (Web AS), which is the basis for SAP applications. Web AS, which may be independent of the database and operating system 630, includes a J2EE engine 626 in combination with the proprietary ABAP (Advanced Business Application Programming) engine or instance 628 to further enhance the application platform 608. In one embodiment, the application platform 608 includes operation of a web service to provide an interface for heterogeneous external clients to manage systems provided by the application platform 608. In one embodiment, the operation of the web service may include an enhanced security process by which an identification is extracted from a communication from an external client that is seeking to manage a system. The identification is transformed to a format compatible with the managed system, and the transformed identification is compared with authorized user data for the managed system system.

The architecture 600 further includes a composite application framework 632 to provide various open interfaces (APIs) and a lifecycle management 634, which is an extension of a previously existing transport management system (TMS). As illustrated, the architecture 600 further provides communication with Microsoft.NET 636, International Business Machine (IBM) WebSphere 638, and other such systems 640.

Figure 7:
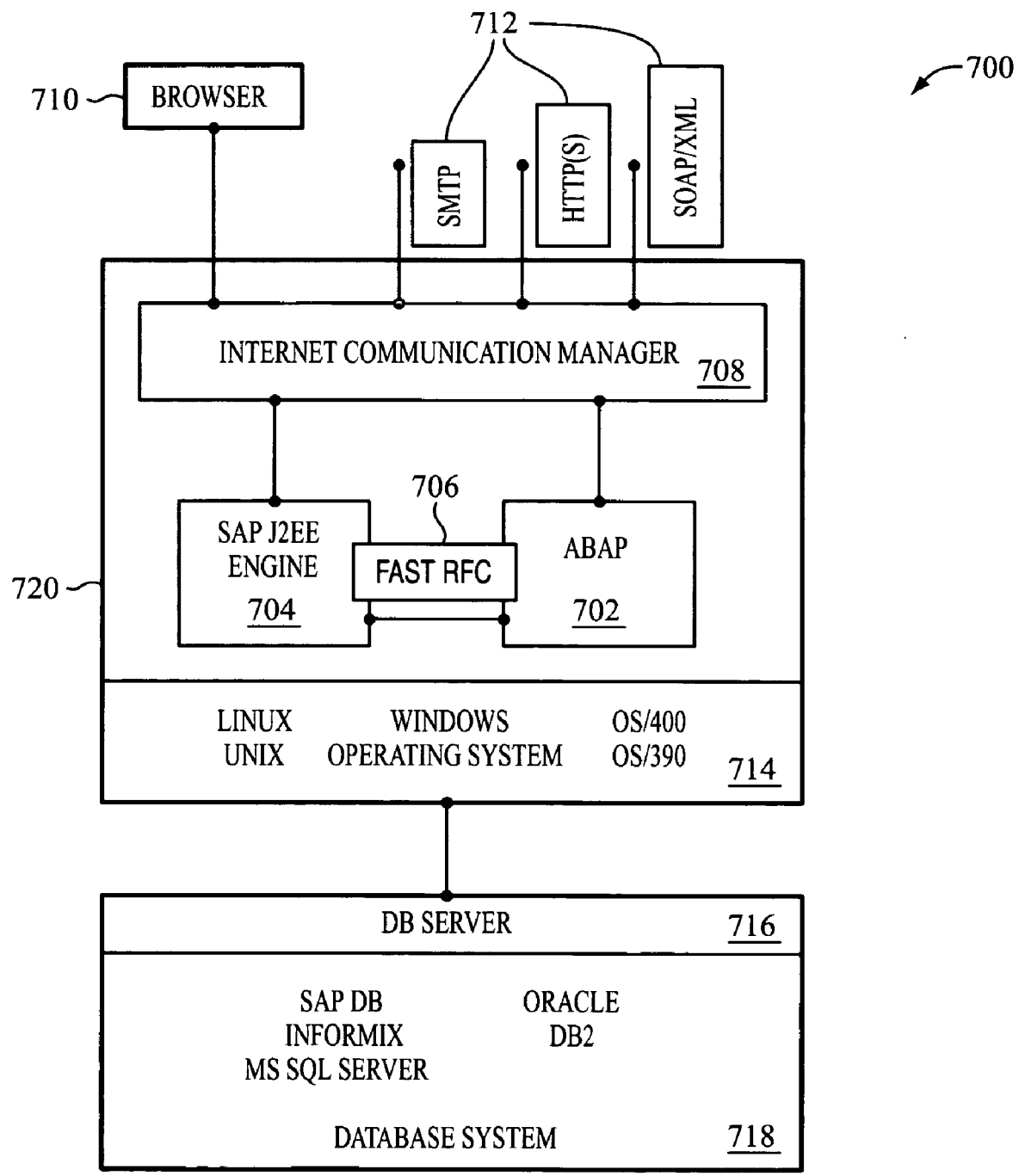
FIG. 7 is a block diagram illustrating an embodiment of an architecture including a Web Application Server.

FIG. 7 is a block diagram illustrating an embodiment of an architecture including a Web Application Server. In this illustration, an architecture 700 serves as an application platform (which may be, for example, the application platform 608 of provided in FIG. 2) for SAP NetWeaver and other SAP products. The architecture 700 includes a Web AS 720 having an ABAP program engine 702, which provides the ABAP development and runtime environment, with the dependability, scalability, and inter-process independence of operating systems 714 and database systems 718. The operating system 714 may include LINUX, UNIX, Windows, OS/390, OS/400, and other such operating systems. The database system 718 may include SAP database (SAP DB), Informix, Oracle, DB2, and other such database systems. The database system 718 is based on a database server 716, such as Microsoft Sequential Query Language (MS SQL) server.

The Web AS 720 with ABAP engine 702 further includes a J2EE program engine 704. The J2EE may support one or more program instances. The J2EE engine 704 is in communication with the ABAP engine 702 via a fast Remote Function Call (RFC) connection 706. The ABAP engine 702 and the J2EE engine 704 are further in communication with an Internet Communication Manager (ICM) 708. The ICM 708 is provided for handling and distributing queries to various individual components of the architecture 700. The architecture 700 further supports a browser 710, such as Microsoft Internet Explorer, Netscape Navigator, and other modified variations of mobile end devices, such as personal digital assistants (PDAs), pocket computers, smart cell phones, other hybrid devices, and the like. The Web AS 720 also supports various protocols and standards 712, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like. In one embodiment, the supported protocols 712 include SOAP and XML for the operation of web service to provide an interface for external management of systems on the Web AS 720. In one embodiment, the web service includes enhanced security by which communications are transformed to obtain identification information compatible with the managed system so as to authenticate the requesting party as a user of the system.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. Embodiments may include a machine-readable medium having stored thereon data representing sequences of instructions that, when executed by a processor, cause the processor to perform certain operations.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
registering a web service in a register as an interface of an application server for one or more external client systems for purposes of managing a computer application stored in a container, wherein the web service interface is used in a start up and control framework for the application server;
receiving a communication from a first client system at the interface, the communication including a request by the first client system to manage the computer application and including identification information for the first client system, the web service interface including a security function to extract identity information, the identification information of the communication including a domain name and a user name for the first client system;
determining if an additional level of security is desired for the interface that is not provided by the web service; and
if the additional level of security is desired for the interface, then:
obtaining the identification information from the communication,
converting the identification information into a format that is compatible with a computer platform for the computer application to be managed, wherein converting the identification information includes generating a searchable identification in the context of the managed computer application by stripping out account information, including the domain name, from the identification information,
determining whether the computer application provides authorization for the first client system to manage the computer application by searching the computer application for authentication of the first client system, and
if the web service interface is successful in extracting information from the computer application to authenticate the first client system, allowing the first client system to engage in management of the computer application.

2. The method of claim 1, wherein determining if the level of security is desired comprises determining whether the request received from the first client system includes a secure object.

3. The method of claim 2, wherein the secure object includes a UNIX domain socket or a Windows named pipe.

4. The method of claim 1, further comprising refusing access to the first client system through the interface if the system does not provide authorization for the first client system.

5. An application server comprising:
a processor to execute instructions;
a container to store data, the data including a computer application, the computer application including authorization data concerning users who are authorized to access the computer application; and
a web service registered as an interface for one or more external client systems, the web service being used in a start up and control framework for the application server, the web service interface to be connected to a first client system for management of the application, the interface to include an enhanced security function, the enhanced security function to extract identification information from a communication from a client system and determine whether the client system has authority to manage the application, wherein extracting identification information and determining authority includes:
obtaining identification information from the communication, the identification information including a domain name and a user name for the first client system,
converting the identification information into a format that is compatible with a computer platform for the computer application to be managed including generating a searchable identification for the managed computer application by stripping out account information, including the domain name, from the identification information,
searching the computer application for authentication of the first client system, and
if the web service interface is successful in extracting information from the computer application to authenticate the first client system, allowing the first client system to engage in management of the computer application.

6. The server of claim 5, wherein the enhanced security function is active if the interface determines that the communication from the first client system is not secure.

7. The server of claim 6, wherein the interface determines that a communication is secure if the communication includes a secure object.

8. A system comprising:
a client system, the client system to provide a communication including a request to manage a computer application, the communication to include identification information regarding the client system, the identification information including a domain name and a user name for the client system; and
a server, the server including a container to store the computer application, and a web service interface and a registry, the interface being registered with the registry, the web service to be used in a start up and control framework for the server, the client system to be coupled with the interface, the computer application including data regarding access credentials;
wherein the interface is to extract the identification information from the communication and convert the identification information into a format compatible with a computer platform for the computer application, wherein converting the identification information includes generating a searchable identification in the context of the managed computer application by stripping out account information, including the domain name, from the identification information, the interface to compare the converted identification information with the data regarding access credentials to determine whether the client system is authorized to access the computer application, and
wherein, if the web service interface is successful in extracting information from the computer application to authenticate the first client system, the interface is to allow the first client system to engage in management of the computer application.

9. The system of claim 8, wherein the registry comprises a UDDI (universal description, discovery, and integration) registry.

10. The system of claim 8, wherein the interface is to refuse access to the client system through the interface if the interface is unable to establish that the client system is authorized to access the computer application.

11. A machine-readable medium having stored thereon data representing sequences of instructions that, when the instructions are executed by a processor, cause the processor to perform operations comprising:

registering a web service as a interface of an application server for one or more external client systems for management of a computer application stored in a container, the web service used in a start up and control framework for the application server;

receiving a communication from a first client system at the interface, the communication including a request by the first client system to manage the computer application and including identification information for the first client system, the web service interface including a security function to extract identity information, the identification information of the communication including a domain name and a user name for the first client system;

determining if an additional level of security is desired for the interface that is not provided by the web service; and if the additional level of security is desired for the interface, then:

obtaining the identification information from the communication, converting the identification information into a format that is compatible with a computer platform for the computer application to be managed, wherein converting the identification information includes generating a searchable identification in the context of the managed computer application by stripping out account information, including the domain name, from the identification information, determining whether the computer application provides authorization for the first client system to manage the computer application by searching the computer application for authentication of the first client system, and if the web service interface is successful in extracting information from the computer application to authenticate the first client system, allowing the first client system to engage in management of the computer application.

12. The medium of claim 11, wherein determining if the level of security is desired comprises determining whether the request received from the first client system includes a secure object.

13. The method of claim 12, wherein the secure object includes a UNIX domain socket or a Windows named pipe.

14. The medium of claim 11, further comprising instructions that, when the instructions are executed by the processor, cause the processor to perform operations comprising refusing access to the first client system through the interface if the system does not include authorization for the first client system.

* * * * *

UNITED STATES PATENT AND TRADEMARK OFFICE
CERTIFICATE OF CORRECTION

PATENT NO. : 7,591,006 B2  Page 1 of 1
APPLICATION NO. : 11/026323
DATED : September 15, 2009
INVENTOR(S) : Randolf Werner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Twenty-first Day of September, 2010

David J. Kappos
*Director of the United States Patent and Trademark Office*